US011878456B2

(12) United States Patent
Bourvellec et al.

(10) Patent No.: US 11,878,456 B2
(45) Date of Patent: Jan. 23, 2024

(54) METHOD FOR ANGULAR INDEXING OF A PREFORM

(71) Applicant: SIDEL PARTICIPATIONS, Octeville-sur-Mer (FR)

(72) Inventors: Loïc Bourvellec, Octeville-sur-Mer (FR); Hervé Pasquier, Octeville-sur-Mer (FR); Marc Mouchelet, Octeville-sur-Mer (FR); Pierrick Protais, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 17/787,452

(22) PCT Filed: Dec. 16, 2020

(86) PCT No.: PCT/EP2020/086376
§ 371 (c)(1),
(2) Date: Jun. 20, 2022

(87) PCT Pub. No.: WO2021/122712
PCT Pub. Date: Jun. 24, 2021

(65) Prior Publication Data
US 2023/0125868 A1    Apr. 27, 2023

(30) Foreign Application Priority Data

Dec. 17, 2019   (FR) ...................... 1914558

(51) Int. Cl.
*B29C 49/42*   (2006.01)
*B29C 49/64*   (2006.01)
(Continued)

(52) U.S. Cl.
CPC ........ *B29C 49/42412* (2022.05); *B29C 49/28* (2013.01); *B29C 49/42065* (2022.05);
(Continued)

(58) Field of Classification Search
CPC .......... B29C 2795/002; B29C 49/6418; B29C 49/42412; B29C 49/42119; B29C 49/42065

See application file for complete search history.

(56) References Cited

U.S. PATENT DOCUMENTS 5,853,775 A    12/1998  Oas
6,769,895 B2*   8/2004  Derouault ............... B29C 49/58
                                                             425/534

(Continued)

FOREIGN PATENT DOCUMENTS

DE    102011075171 A1   11/2012
FR         3001912 A1    8/2014
(Continued)

OTHER PUBLICATIONS

Machine translation of WO2019043215A1 dated Mar. 2019. (Year: 2019).*

(Continued)

*Primary Examiner* — Robert B Davis

(57) ABSTRACT

A process for angular indexing of a pre-form having a body and a neck. The process includes a step of marking the neck of the pre-form which consists of production of at least one reference point on the neck of the pre-form. The process also includes a step of a heating station taking charge of the pre-form, during which the pre-form is transported along a heating course by a support unit, known as a spinner, which makes it possible to turn the pre-form around its axis, and during which the body of the pre-form is heated. The marking step is carried out during the step of taking charge, when the pre-form, supported by a spinner, travels along the heating course.

20 Claims, 5 Drawing Sheets

(51) Int. Cl.
   *B29C 49/28* (2006.01)
   *B29K 67/00* (2006.01)
   *B29L 31/00* (2006.01)

(52) U.S. Cl.
   CPC .... *B29C 49/42119* (2022.05); *B29C 49/6418* (2013.01); *B29C 2795/002* (2013.01); *B29K 2067/003* (2013.01); *B29L 2031/712* (2013.01)

(56) References Cited

U.S. PATENT DOCUMENTS

| | | | | |
|---|---|---|---|---|
| 2012/0085071 A1* | 4/2012 | Hahn | ........................ | B67B 3/26 |
| | | | | 53/425 |
| 2012/0089252 A1 | 4/2012 | Kwirandt | | |
| 2022/0307989 A1* | 9/2022 | Laico | .................... | B65G 15/14 |

FOREIGN PATENT DOCUMENTS

| | | | | | |
|---|---|---|---|---|---|
| GB | | 1340974 A | * | 12/1973 | ............. B29C 49/42 |
| WO | WO-2019043213 A1 | * | 3/2019 | | |
| WO | WO-2019043215 A1 | * | 3/2019 | | |

OTHER PUBLICATIONS

Machine translation of WO2019043213A1 dated Mar. 2019. (Year: 2019).*
International search report dated Feb. 23, 2021.

* cited by examiner

[Fig. 1]
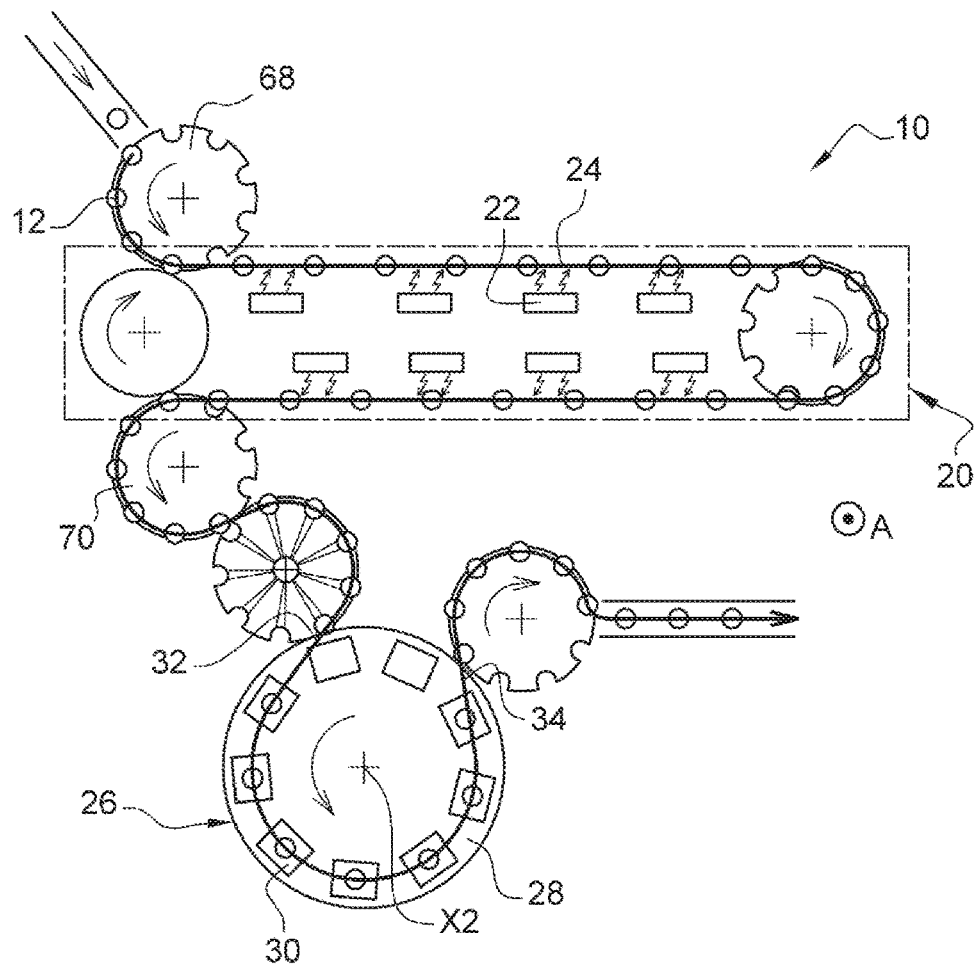
[Fig. 2]
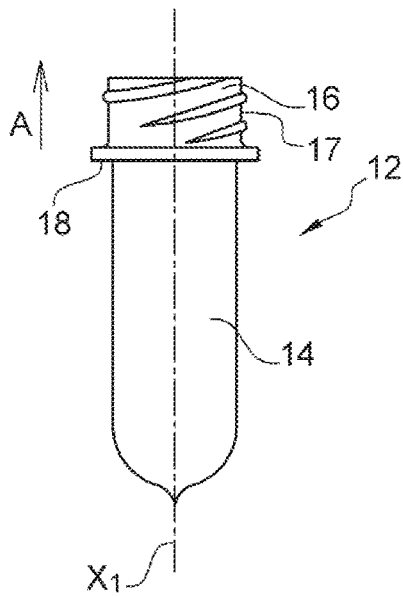

[Fig. 3]
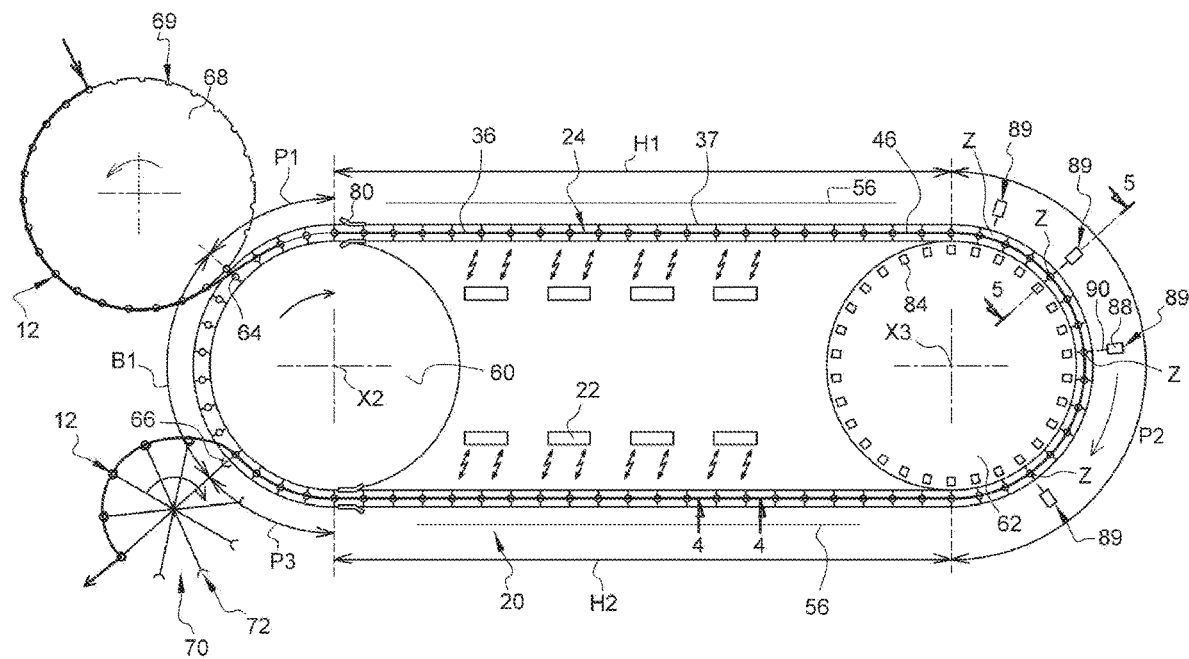

[Fig. 4]
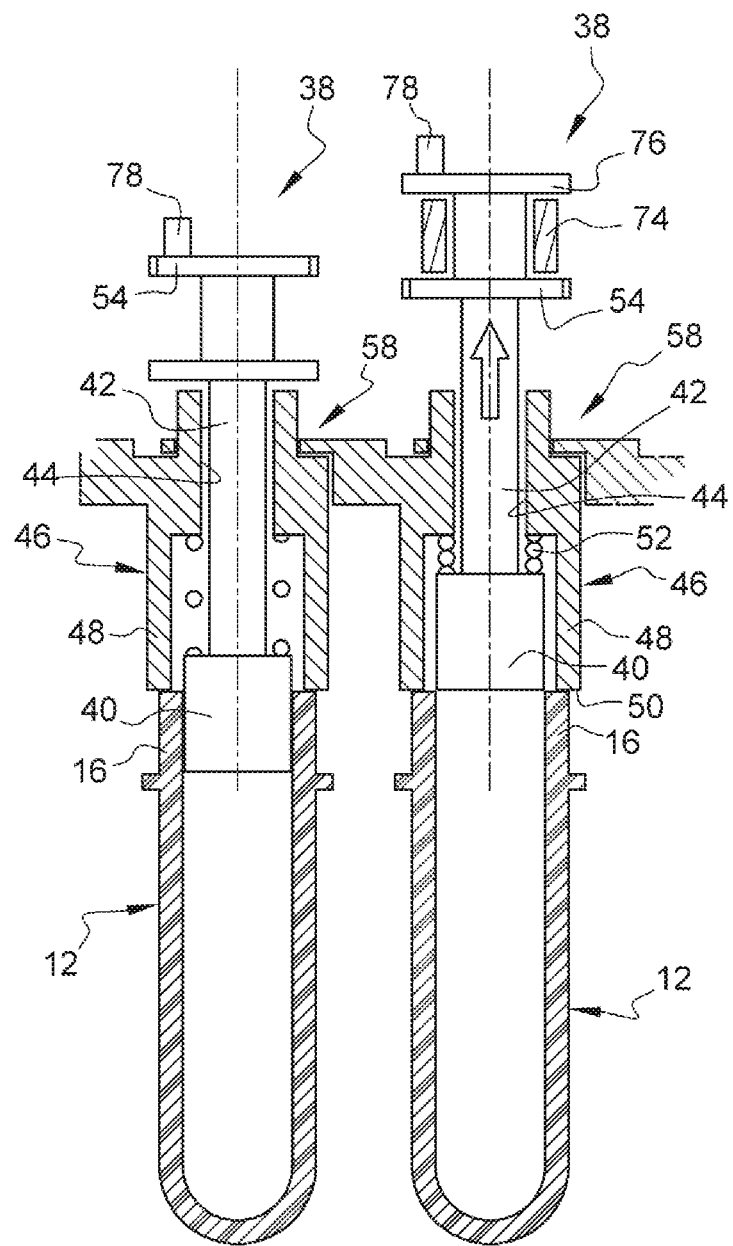

[Fig. 5]
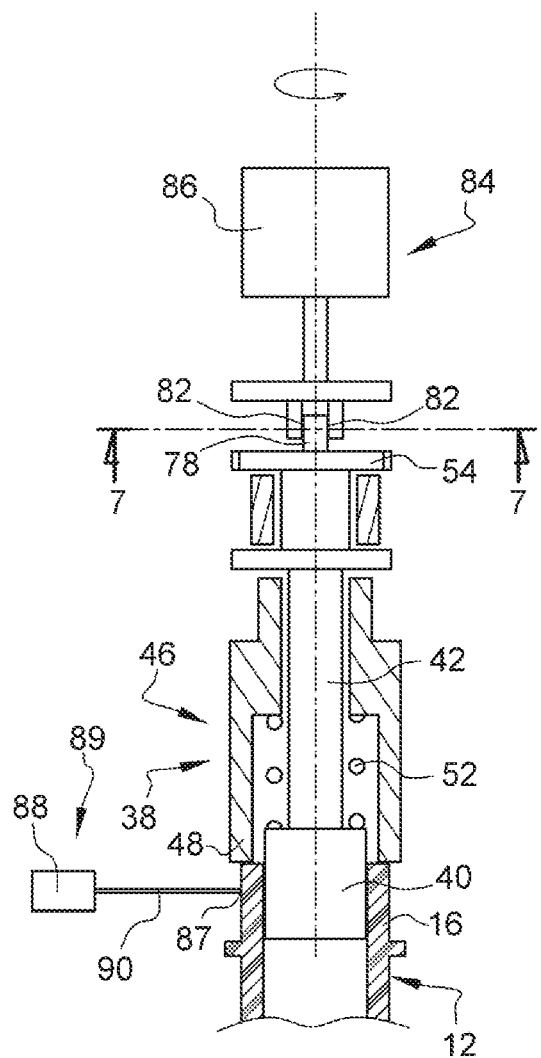
[Fig. 6]
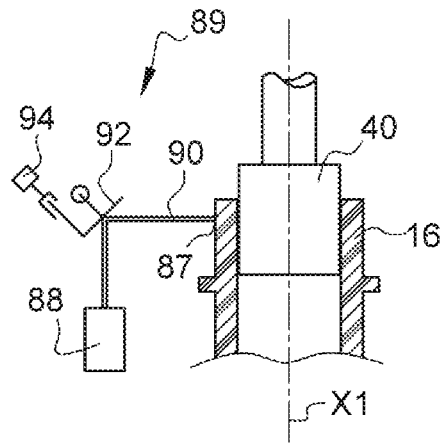

[Fig. 7]
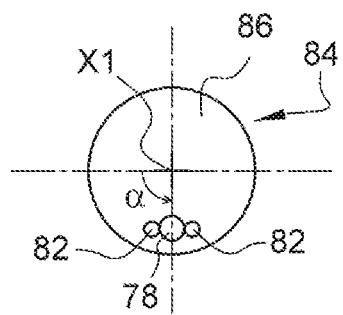
[Fig. 8]
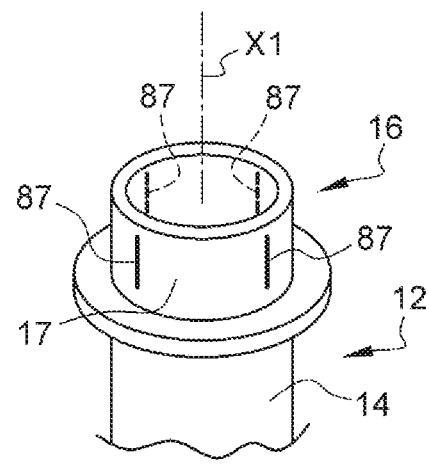
[Fig. 9]
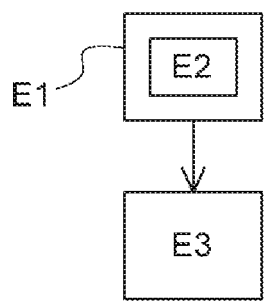

METHOD FOR ANGULAR INDEXING OF A PREFORM

TECHNICAL FIELD OF THE INVENTION

The invention concerns a process for angular indexing of a pre-form which comprises a body and a neck, the process comprising:
a step of marking the neck of the pre-form which consists of creating at least one reference point on the neck of the pre-form;
a step of a heating station taking charge of the pre-form, during which the pre-form is transported along a heating course by a support unit, known as a spinner, which makes it possible to turn the pre-form around its axis, and during which the body of the pre-form is heated.

The invention also concerns a heating station for implementation of a process of this type.

TECHNICAL BACKGROUND

It is known to produce containers from thermoplastic material, and in particular from polyethylene terephthalate (PET) by blowing of pre-forms, the body of which is previously heated. The pre-forms have a neck which is already molded to its definitive form, and is therefore designed to remain unchanged during the production of the container.

In many cases, the pre-forms are produced by injection in a first location, and are molded by blowing of the container to the definitive form in a second location on a specific production installation. Technology of this type makes it possible to proceed with the operation of molding by blowing as close as possible to the place of bottling, with the injection operation being able to be carried out in any location. In fact, it is relatively easy and inexpensive to transport pre-forms of a reduced size, whereas transporting containers after blowing has the disadvantage of being not economically viable because of their very large volume. Mass production of containers of this type is carried out in a container production installation.

In order to allow it to be formed, the body of the pre-form is heated to above a vitreous transition temperature, which makes it possible to make the wall of the body malleable, while reducing its yield point substantially. On the other hand, the neck is maintained at a temperature lower than the vitreous transition temperature, in order to prevent its deformation. For this purpose, the production installation comprises a heating station which makes it possible to heat the body of the pre-forms to the temperature required in order to carry out the forming step. Then, the pre-forms thus heated are subsequently conveyed to a blowing station of the production installation. The blowing station is equipped with numerous blowing units, each of which comprises a mold and a blowing or stretching-blowing nozzle. The large number of blowing units makes it possible to produce the containers at a fast pace, for example of 50,000 bottles or more per hour. The blowing units are for example supported by carousel which rotates such that the pre-forms are blown one after another at a fast pace during their displacement between a point of introduction corresponding to the introduction of the pre-forms into an associated mold, and a point of removal from the mold corresponding to ejection of the containers formed to the exterior of the molds.

The containers thus obtained are received as they exit from the mold by grasping means of a transfer wheel, in order for them to be conveyed in a line to another device, via a conveyor belt for example. The following station is for example a station for filling of the containers or a station for labelling of the containers. It is sometimes necessary to modify the angular orientation of the pre-forms or of the containers during their displacement.

Modification of this type of the angular orientation is necessary for example when the containers have at least one section which is not axisymmetrical relative to the axis of the neck.

In order to obtain non-axisymmetrical containers of this type, the pre-forms are generally heated, preferably on certain parts, according to a process which is generally known as "preferential heating". The pre-forms are then received in molds with a clearly determined orientation around their main axis, in order to make the heating profile of the bodies correspond to the imprint of the non-axisymmetrical container to be obtained.

In addition, the non-axisymmetrical containers thus obtained must be presented with a well-defined orientation in a downstream labelling device, so that a label is applied to a receipt face reserved for this purpose on the non-axisymmetrical container.

A modification of this type of the angular orientation is also necessary in other configurations, for example on certain containers which are or are not axisymmetrical, which are designed to be equipped with spraying diffusers which must be oriented correctly relative to a label of the container.

The stations themselves are generally equipped with devices for transport of the containers, such as carousels. The modification of the angular orientation of the container can take place directly on these transport devices and/or on devices for transfer between two stations.

In order to permit satisfactory orientation of the pre-forms and or of the containers, it is known to equip the neck of the pre-forms with a reference point which makes it possible to carry out their angular orientation around the axis of the neck relative to a support. With the neck maintaining its form during the process of production of the container, this reference point continues to be usable in order to permit the orientation of the finished container around the axis of its neck.

This reference point makes it possible to determine the angular orientation of the pre-form or of the container relative to its support, and optionally to modify the angular orientation of the pre-form or of the support in order to bring the reference point into a reference position which is determined relative to the support.

A reference point of this type is generally produced during molding of the pre-form by injection. It is for example a notch produced in a collar of the neck, or also a lug produced in a groove situated above the collar. The pre-form is thus already equipped with its reference point before the production installation is supplied with containers.

However, a pre-form of this type involves indexing the orientation of the pre-form for a first-time when the heating station takes charge of it in order to make the heating profile correspond to the reference point with which the pre-form is already equipped. The orientation of the pre-form must then be verified and corrected once more when the blowing station takes charge of it in order for the heating profile to correspond satisfactorily to the imprint of the mold.

However, when the heating station takes charge of the pre-form with an angular indexing error, its heating profile no longer coincides with its reference point. This error has repercussions in the mold, since the orientation of the pre-form in the mold is determined thanks to its reference point.

SUMMARY OF THE INVENTION

The invention proposes a process for angular indexing of a pre-form which comprises a body and a neck, the process comprising:

a step of marking the neck of the pre-form which consists of production of at least one reference point on the neck of the pre-form;

a step of a heating station taking charge of the pre-form, during which the pre-form is transported along a heating course by a support unit, known as a spinner, which makes it possible to turn the pre-form around its axis;

wherein the marking step is carried out during the step of taking charge, when the pre-form is supported by a spinner.

According to other characteristics of the process carried out, separately or in combination, according to the teaching of the invention:

the body of the pre-form is heated during a heating phase included in the step of taking charge;

the heating course comprises at least one active section along which the body of the pre-form is exposed directly to heating radiation, and at least one passive section along which the body of the pre-form is not exposed to heating radiation, the marking step being carried out when the pre-form is situated on the passive section;

the marking step comprises at least one operation of production of a reference point, which consists of exposing a determined angular area of an outer face of the neck to a laser beam which is sufficiently powerful to mark the neck of the pre-form locally;

the marking step comprises at least one operation of production of a reference point which consists of printing the reference point on an outer face of the neck with a marking substance, such as ink;

the rotation of the pre-form around its axis is interrupted during each marking operation;

the marking operation is carried out while the pre-form is rotating around its axis;

the marking step comprises at least two operations of production of reference points in two distinct angular areas of the neck;

the process comprises a step of installation of the hot pre-form in a forming mold upon completion of the step of the heating station taking charge of the pre-form, the pre-form being oriented in an angular reference position relative to the mold by means of the reference points produced during the marking step.

The invention also concerns a heating station for implementation of the process carried out according to the teaching of the invention, the heating station comprising:

a device for transport of pre-forms comprising a chain of spinners in order to displace the pre-forms along a heating course;

units for heating of the pre-forms which are arranged along at least a first active section upstream from the heating course, at least one passive section of the heating course not being exposed to heating units;

wherein the heating station comprises at least one marking device which is arranged along the at least one passive section.

According to other characteristics of the heating station produced according to the teaching of the invention:

the marking device comprises a laser emitter which is arranged such as to emit a laser beam in the direction of the neck of the pre-form supported by a spinner situated on the at least one passive section;

the marking device comprises a print head which is arranged such as to print the reference point on the neck of a pre-form supported by a spinner situated on the at least one passive section;

the heating course comprises a second downstream active section, at least one passive section being interposed between the two active sections, the at least one marking device being arranged along said passive section;

the heating course comprises at least one passive section which is arranged upstream from the upstream active section, the at least one marking device being arranged along said passive section;

the heating course comprises at least one passive section which is arranged downstream from the downstream active section, the at least one marking device being arranged along said passive section.

BRIEF DESCRIPTION OF THE FIGURES

Other characteristics and advantages of the invention will become apparent from reading the following detailed description, for understanding of which reference will be made to the appended drawings in which:

FIG. 1 is a view from above which represents schematically an installation for production of containers from pre-forms;

FIG. 2 is a profile view which represents a pre-form designed to be taken charge of by the installation in FIG. 1;

FIG. 3 is a detailed view on an enlarged scale which represents schematically a heating station belonging to the production installation in FIG. 1, the heating station being able to implement an angular indexing process according to the invention;

FIG. 4 is a view in cross-section along the cross-sectional plane 4-4 in FIG. 3 which represents a portion of a pre-form transport chain through the heating station;

FIG. 5 is a view in cross-section along the cross-sectional plane 5-5 in FIG. 3, which represents a pre-form undergoing an operation of marking by means of a marking device produced according to a first embodiment of the invention;

FIG. 6 is a view similar to that of FIG. 5, which represents the marking device produced according to a second embodiment of the invention;

FIG. 7 is a view in cross-section along the cross-sectional plane 7-7 in FIG. 5, which represents a crank pin of a spinner engaged between two fingers of a device for orientation;

FIG. 8 is a view in perspective representing the neck of a pre-form which has undergone four marking operations during implementation of the process according to the invention, in the heating station in FIG. 3;

FIG. 9 is a block diagram which represents the indexing process carried out according to the teaching of the invention.

DETAILED DESCRIPTION OF THE INVENTION

Hereinafter in the description, elements with an identical structure or similar functions will be designated by the same reference. Hereinafter in the description, the terms "upstream" and "downstream" will be used with reference to the direction of displacement of the pre-forms along a production course.

FIG. 1 represents schematically an installation 10 for mass production of containers made of thermoplastic material from pre-forms 12. The thermoplastic material is in this case formed by polyethylene terephthalate, designated hereinafter by its acronym "PET".

FIG. 2 represents an example of a pre-form 12. A pre-form 12 of this type is produced from thermoplastic material, in this case from polyethylene terephthalate (PET). It has a main axis "X1" represented vertically in FIG. 2. It comprises a body 14 with a closed axial end, represented at the bottom in FIG. 2. The body 14 opens at its opposite end, represented at the top in FIG. 2, into an open neck 16. The neck 16 has a tubular form, the main axis of which defines the main axis "X1" of the pre-form 12. The body 14 has generally an axisymmetrical form of an elongate tube according to the main axis "X1". The neck 16 of the pre-form also comprises an annular collar 18 which projects radially. The neck 16, including the collar 18, is delimited towards the exterior by an outer face 17.

A portion of the outer face 17 of the neck 16 has a globally cylindrical form. It generally comprises means for securing a stopper, for example a thread or a groove for resilient fitting of the stopper.

With reference to FIG. 1, the installation 10 comprises a station 20 for heating of the pre-forms 12. By way of non-limiting example, the heating station 20 is formed by a tunnel in which there are arranged heating units 22 which emit heating electromagnetic radiation, for example infrared radiation, such as halogen lamps or laser emitters.

As will be explained in greater detail hereinafter, a device 24 for transport of the pre-forms 12 is arranged such as to make them pass along heating units 22, from an entry to an exit of the tunnel. The direction of travel of the hollow bodies is indicated by the arrows in FIG. 1.

When it exits from the heating station 20, the body 14 of the pre-form 20 is rendered malleable by being heated to above a vitreous transition temperature, whereas the neck 16 is maintained at a temperature which is sufficiently low to maintain its original form. The installation 10 also comprises a station 26 for forming of the pre-forms 12 thus heated. The forming station 26 is arranged downstream from the heating station 20 with reference to the flow of pre-forms 12 in the installation 10.

In this case, the forming station 26 comprises a carousel 28 which supports a plurality of forming units 30. The carousel is fitted such as to rotate around a central axis "X2". Each forming unit 30 can thus be displaced around the axis "X2" of the carousel 28, between a point 32 of loading of the pre-forms in the form of hot pre-forms, and a point 34 of unloading of the pre-forms 12 in the form of final containers, before beginning a new cycle. In particular, each forming unit 30 comprises a mold (not represented) provided with an imprint for molding of the final container.

FIG. 3 represents the heating station 20 in greater detail. The transport device 24 makes it possible to displace the pre-forms 12 in a line along a heating course 36 which is indicated in bold in FIG. 3.

The transport device 24 comprises a chain 37 of support units, hereinafter known as "spinners 38", each of which can support a pre-form 12 individually.

As represented in FIG. 4, a spinner 38 of this type conventionally comprises a mandrel 40 which in this case is fitted into the neck 16 of a pre-form 12. The mandrel 40 is for example forced into the neck 16 of the pre-form 12, which is thus temporarily rendered integral with the mandrel 40 by friction. The friction necessary is for example provided by a ring made of elastomer material (not represented), which is positioned in a groove around the mandrel 40.

The mandrel 40 is secured on the lower end of a shaft 42 with an axis which is coaxial with that of the pre-form 12 supported. The shaft 42 is received in a bearing 44 for guiding of a coupler 46 of the transport device 24. More particularly, the shaft 42 is fitted such as to rotate in the guide bearing 44 around its main axis "X1". This rotation advantageously makes it possible to expose all of the body 14 of the pre-form 12 in a controlled manner to the heating radiation emitted by the heating units 22.

In addition, in this case, the shaft 42 is fitted such as to slide axially relative to the coupler 46. The coupler 46 comprises a lower sleeve, which has a lower end annular face 50, known as the "stripper face 50". The shaft 42 is thus fitted such as to slide between an active lower position, as represented on the left in FIG. 4, in which the mandrel 40 can be fitted in a neck 16 of the pre-form, and an inactive upper position, as represented on the right in FIG. 4, in which the mandrel 40 is retracted into the sleeve 48, above the stripper face 50, in order to permit extraction of the mandrel 40 from the neck 16 of the pre-form, which remains blocked on the exterior of the sleeve 48 by abutment against the stripper face 50.

In general, the mandrel 40 is controlled towards its inactive position by means of a cam device (not represented), whereas it is thrust towards its active position by a resilient unit 52, in this case a spring, which is interposed axially between the mandrel 40 and the coupler 46.

The rotation of the mandrel 40 around the main axis "X1" of the pre-form 12 is in this case controlled by means of a pinion 54, which in this case is arranged at an upper end of the shaft 42, above the coupler 46. The pinion 54 is designed to cooperate with a rack 56, which is positioned on at least a section of the course of the pre-forms 12 in the oven.

In a variant not represented of the invention, the rotation of the mandrel 40 is controlled by an individual electric motor, which is on board the coupler 46. The rotation is then controlled by an electronic control unit.

In this case, each coupler 46 supports a single spinner 38. As a variant, one coupler can support two spinners. The couplers 46 are fitted articulated in a chain with one another around the vertical axis "X1" by means of a hinge 58. The couplers 46 are thus assembled in order to form the closed chain 37.

The chain 37 is engaged around a first guide wheel 60 and a second guide wheel 62, which are each fitted such as to rotate around vertical axes "X2, X3". At least one of the guide wheels 60, 62 is driven, in this case clockwise, by a motor (not represented).

In this case, each spinner 38 is displaced continuously, i.e. without interruption, along a closed circuit. The completion of a complete turn of the closed circuit by a spinner 38 will be known as a "cycle" hereinafter.

A useful section, represented in a bold line in FIG. 1, of said closed circuit, forms a processing course along which each spinner 38 is designed to take on board a pre-form 12, whereas another empty section which the spinners 38 pass along unloaded completes the circuit.

On the useful section, each spinner 38 transports a pre-form from a point 64 for taking charge of the pre-forms 12, as far as a point 66 for transfer of the pre-forms 12 to the blowing station 26. The point 64 for taking charge and the point 66 for transfer are arranged on the periphery of the first guide wheel 60.

The pre-forms 12 are conveyed one by one as far as the point 64 for taking charge, for example by means of a wheel 68 with notches. At the point 64 for taking charge, each mandrel 40 is fitted into the neck 16 of a pre-form 12 conveyed by the wheel 68 with notches. The wheel 68 with notches is provided with notches 69 on its periphery, each of which is designed to support a pre-form 12.

When they have completed the treatment course, the hot pre-forms 12 are transferred to a transfer wheel 70, which in this case is equipped with grippers 72 designed to grasp each pre-form 12 by its neck 16. The spinners 38 are then controlled towards their inactive position by means of a control fork 74, which in this case is supported by the first guide wheel 60. More particularly, the first guide wheel 60 comprises a plurality of forks 74 on its periphery. A groove 76 of each spinner 38 is designed to be engaged with a fork 74, in order to control the sliding thereof, as illustrated in FIG. 4.

On the unloaded section, the spinners 38 are displaced unloaded from the point 66 of transfer to the point 64 of taking charge. The unloaded section is arranged on a portion "B1" of the chain 37 which is engaged around the first guide wheel 60.

The heating course comprises at least one active section, along which the body 14 of the pre-form 12 is exposed directly to the heating radiation of the heating units 22, and at least one passive section, along which the body 14 of the pre-form 12 is not exposed to the heating radiation of the heating units 22.

In the example illustrated in the figures, the heating station 20 comprises an upstream active section "H1" and a downstream active section "H2" which are formed by two straight portions of the transport chain 37 stretched between the two guide wheels 60, 62. The heating units 22 are arranged along these two active sections "H1, H2" such that the bodies 14 of the pre-forms 12 which pass along these active sections "H1, H2" are exposed to the heating radiation. The pre-forms 12 are generally rotated around their axis "X1" when they pass along the active heating sections "H1, H2", in order to make it possible to heat the body 14 of the pre-forms 12 all around their circumference. For this purpose, each section "H1, H2" comprises an associated rack 56 to rotate the spinners 38.

The orientation of each spinner 38 is controlled throughout the heating course. In the embodiment represented in the figures, in particular in FIG. 4, each spinner in this case comprises a crank pin 78 which is arranged in a manner which is eccentric relative to the axis "X1" of rotation. The crank pin 78 is designed to make it possible to orient the spinner 38 correctly at the start of the heating course by passing between a gap 80 between two converging ramps positioned along the course of the spinners 38. The crank pin 78 is thus positioned automatically in the upstream direction relative to the direction of displacement of the spinners 38. At the exit from this gap 80 between converging ramps, the pinions 54 engage directly with the rack 56, such that the orientation of the spinners 38 can easily be deduced from its position along the heating course, for as long as the pinion 54 is engaged with the rack 56.

When the spinners 38 reach the level of the second guide wheel 62, the crank pin 78 is received between two fingers 82 of an orientation device 84. The orientation device 84 also comprises a motor 86 which makes it possible to turn the fingers 82 around the axis "X1", in order to be able to orient the spinners 38 around their axes "X1", as illustrated in FIGS. 5 and 7. The second guide wheel 62 also comprises a plurality of orientation devices 84, which are arranged on the periphery, such that each spinner 38 is taken charge of by an orientation device 84 between the two racks 56.

As a variant not represented of the invention, the racks and/or the orientation devices can be replaced by an individual motor for rotation of the spinner which is supported by each coupler. Protection units (not represented) are provided to protect the neck 16 of the pre-forms 12 against the heating radiation, in order to maintain the neck 16 at a temperature lower than the vitreous transition temperature.

In this case, the heating course comprises three passive sections along which the body 14 of the pre-forms 12 is not exposed to the heating radiation emitted by the heating units 22. A first upstream passive section "P1" is arranged between the point 64 of taking charge and the upstream active section "H1". A second, intermediate passive section "P2" is interposed between the upstream active section "H1" and the downstream active section "H2". The second, intermediate passive section "P2" has more particularly a form in the shape of an arc of a circle, since it extends over a portion of the chain 37 which is engaged around the second guide wheel 62. The third downstream passive section "P3" is arranged between the downstream end of the downstream active section "H2" and the point 66 of transfer. In this case, no heating unit is arranged along the passive sections. In a known manner, when the installation 10 is operating in a mode for production of the containers, each pre-form 12 undergoes a step "E1" of being taken charge of by the heating station 20. This step "E1" of taking in charge begins when the pre-form 12 is taken in charge by a spinner 38 at the point 64 of taking in charge, and ends when the pre-form 12 is transferred to the transfer wheel 70 at the point 66 of transfer. Thus, throughout this step "E1" of taking in charge, each pre-form 12 is transported along the heating course by an associated spinner 38. During this step "E1", the body 14 of the pre-form is heated while the pre-form 12 passes along the active sections "H1, H2" of the heating course. The parametrization of each heating unit 22 can be controlled in order to heat certain portions of the body 14 of the pre-form 12 to a greater or lesser extent. The parameters which can be regulated comprises for example the position of the heating units 22 relative to the heating course, and/or the power of the radiation emitted by the heating units 22. The parameters are for example controlled automatically by an electronic control unit. Thus, by controlling simultaneously the orientation of the spinner 38 and the power of the heating radiation at any point of the heating course, it is possible to carry out heating of the body 14 of the pre-form 12 according to a so-called "preferential" heating profile, which then makes it possible to provide the final container with a non-axisymmetrical form during the forming operation.

As explained in the preamble, in certain applications it is necessary to orient the pre-form 12 and/or the final container before carrying out processing. For example, a pre-form 12 which is heated according to a "preferential" heating profile must be oriented to correspond with the form of the imprint of the mold in the forming unit 30. For this purpose, it is known to produce a reference point 87 on the neck 16 of the pre-form 12, since the neck 16 does not undergo any transformation.

The invention concerns an angular indexing process comprising a marking step "E2" which consists of production of at least one reference point 87 on the neck 16 of the pre-form 12.

According to the teaching of the invention, the marking step "E2" is carried out during the step "E1" of taking charge, while the pre-form 12, supported by a spinner 38, travels along the heating course, as illustrated in FIG. 9. More specifically, the marking step "E2" is triggered after the beginning of the step "E1" of taking charge, and is completed before the end of the step "E1" of taking charge. This process advantageously makes it possible not to have to be concerned with the orientation of the pre-forms when they are taken charge of by the heating station 20.

The step "E2" of marking is in this case carried out by an operation of production of a reference point 87, which consists of exposing a determined angular area of the outer face 17 of the neck 16 to a laser ray which is sufficiently powerful to mark the neck 16 of the pre-form 12 locally. The laser ray is focused on a portion of the neck 16 which is very small relative to its dimensions. The thermoplastic material which is exposed to the laser ray then gives rise locally to the appearance of a visual reference point 87 by modification of the structure of the material. For this purpose, the heating station 20 is equipped with at least one marking device 89. The marking device 89 is for example arranged in a manner which is fixed relative to the ground, facing the heating course.

In this case, the marking device 89 comprises a laser emitter 88, which can emit a laser beam 90 in the direction of the neck 16 of a pre-form 12 supported by a spinner 38. The laser beam 90 is preferably emitted substantially orthogonally to the outer face 17 of the neck 16.

As a variant, the heating station 20 comprises a plurality of laser emitters 88 which are supported by the second guide wheel 62. Each laser emitter 88 is thus associated with an orientation device 84.

The laser emitter 88 can emit the laser beam 90 directly towards the neck 16, as illustrated in FIG. 5.

As a variant, as illustrated in FIG. 6, the marking device 89 comprises a mirror 92. The laser emitter 88 firstly emits a laser beam 90 towards the mirror 92, which then reflects the laser beam 90 in the direction of the neck 16. This therefore makes it possible to displace the laser beam 90 easily, in order to obtain a reference point 87 with the required form, by acting only on the orientation of the mirror 92, without modifying the orientation of the laser emitter 88, for example by means of a motor 94. This makes it possible for example to obtain a reference point 87 forming a straight line parallel to the axis "X1" of the pre-form 12.

According to a variant, not represented, of the invention, the marking step "E2" comprises at least one operation of production of a reference point which consists of printing the reference point on the outer face of the neck with a marking substance such as ink. For this purpose, the marking device 89 is formed by a print head which is arranged such as to print the reference point 87 on the neck 16 of a pre-form 12 supported by a spinner 38. This can be a visible ink or an invisible ink which can be revealed by exposure to radiation with a determined wavelength, such as ultraviolet radiation.

The marking step "E2" is for example carried out when the pre-form 12 is situated on a passive section "P1, P2, P3" of the heating course. This makes it possible firstly to benefit from more space in order to arrange the marking device 89, but also to avoid subjecting the marking device 89 to excessively intense heating.

In this respect, the marking device 89 is arranged along one of the passive sections "P1, P2, P3".

Advantageously, in order to be able to control the orientation of the pre-form 12 freely during the marking operation, the marking device 89 is arranged along the second passive section "P2".

Thus, the orientation of the pre-forms 12 can be controlled by means of the orientation device 84, which itself is controlled by an electronic control unit (not represented).

However, the marking operation can also take place in the first passive section "P1" or in the third passive section "P3" when the orientation of the pre-forms 12 can be controlled there, for example by means of an individual motor. In this case, at least one marking device 89 is arranged along the first and/or the third passive section "P1, P3". The marking devices 89 are controlled automatically by an electronic control unit, in order to proceed with an operation of production of a reference point 87 on the neck 16 of a pre-form 12, when the pre-form 12 reaches a marking area "Z" situated facing the marking device 89.

Although the operation of marking by means of a laser beam 90 or by means of a print head is very rapid, the rotation of the pre-form 12 around its axis "X1" can be interrupted during the operation, in order to permit more precise marking of the pre-form 12. On the other hand, it will be appreciated that the displacement of the pre-forms 12 along their heating course continues at a constant speed.

As a variant, the marking operation is carried out while the pre-form 12 is rotating around its axis "X1".

The marking step "E2" comprises at least two operations of production of reference points at two distinct angular areas at least of the neck 16. In general, the marking step "E2" comprises as many operations of production of reference points as the number of reference points 87 required to mark the neck 16 of the pre-form 12.

In the example represented in FIG. 3, the marking step "E2" comprises four operations of production of a reference point, such that the neck 16 of the pre-form has four reference points 87 by the time it reaches the transfer point 66, as illustrated in FIG. 8. Each operation of production of a reference point is in this case implemented by an associated marking device 89, as illustrated in FIG. 3. All the marking devices 89 are identical. In this case, they are distributed along the second, passive section "P2". In order to make it possible to produce each reference point 87 on a different angular sector of the neck 16, the spinner 38 is pivoted around its axis "X1" by the associated device 84 for orientation of the second guide wheel 62, such that on arrival, the neck 16 has the required angular sector of its outer face 17 facing each of the marking devices 89. In the example represented in FIG. 7, the spinner 38 is pivoted by an angle α, which in this case is equal to 90°, between each marking device 89. Thus, upon completion of the marking step "E2", the neck 16 comprises four reference points 87, which are arranged at 90° relative to one another around the axis "X1".

Since the orientation of the spinner 38, and consequently of the pre-form 12 which is supported by said spinner 38, is controlled along the entire heating course, the reference points 87 are positioned precisely relative to the heating profile of the pre-form 12. The risk of positioning error of the reference points relative to the heating profile of the pre-form 12 is thus greatly reduced in comparison with the marking processes according to the prior art. The pre-form 12 thus marked thanks to the process according to the invention thus continues its travel as far as the forming station 26.

During a step "E3" of installation of the hot pre-form 12 in a forming mold, upon completion of the step "E1" of being taken charge of by the heating station 20, the pre-form 12 is oriented in an angular reference position relative to the mold by means of the reference points 87 produced during the marking step "E2". According to a non-limiting example, the pre-form 12 is oriented in the mold by means of a rotary nozzle as described in document FR 2.764.544. The angular position of the pre-form 12 relative to the mold can be defined precisely, for example by means of an image capturing device which captures an image of the neck. The image can then be analyzed by image processing software, which will make it possible to determine precisely the angle of rotation necessary in order to bring the pre-form 12 into its angular reference position relative to the mold.

The invention claimed is:

1. A process for angular indexing of a pre-form (12) which comprises a body (14) and a neck (16), the process comprising:
   a step (E2) of marking the neck (16) of the pre-form (12) during which at least one reference point (87) is produced on the neck (16) of the pre-form (12);
   a step (E1) of a heating station (20) taking charge of the pre-form (12), during which the pre-form (12) is transported along a heating course by a spinner (38), which makes it possible to turn the pre-form (12) around its axis (X1);
   wherein the marking step (E2) is carried out during the step (E1) of taking charge, when the pre-form (12) is supported by the spinner (38), and wherein the heating course comprises at least one active section (H1, H2) along which the body (14) of the pre-form (12) is exposed directly to heating radiation, and at least one passive section (P1, P2, P3) along which the body (14) of the pre-form (12) is not exposed to heating radiation, the marking step (E2) being carried out when the pre-form (12) is situated on the passive section (P1, P2, P3).

2. The process as claimed in claim 1, wherein the marking step (E2) comprises at least one operation of production of a reference point (87), during which a determined angular area of an outer face (17) of the neck (16) is exposed to a laser beam (90) which is sufficiently powerful to mark the neck (16) of the pre-form (12) locally.

3. The process as claimed in claim 1, wherein the marking step (E2) comprises at least one operation of production of a reference point (87), during which the reference point (87) is printed on an outer face (17) of the neck (16) with a marking substance, the marking substance comprising ink.

4. The process as claimed in claim 2, wherein the rotation of the pre-form (12) around its axis (X1) is interrupted during each marking operation.

5. The process as claimed in claim 2, wherein the marking operation is carried out while the pre-form (12) is rotating around its axis (X1).

6. The process as claimed in claim 2, wherein the marking step (E2) comprises at least two operations of production of reference points (87) in two distinct angular areas of the neck (16).

7. The process as claimed in claim 1, wherein it comprises a step (E3) of installation of the hot pre-form (12) in a forming mold upon completion of the step (E1) of the heating station (20) taking charge of the pre-form, the pre-form (12) being oriented in an angular reference position relative to the mold by means of the reference points (87) produced during the marking step (E2).

8. A heating station (20) for implementation of the process as claimed in claim 1, the heating station (20) comprising:
   a device (24) for transport of pre-forms (12) comprising a chain (37) of spinners (38) in order to displace the pre-forms (12) along a heating course;
   units (22) for heating of the pre-forms (12) which are arranged along at least a first active section (H1) upstream from the heating course, at least one passive section (P1, P2, P3) of the heating course not being exposed to heating units (22),
   wherein the heating station (20) comprises at least one marking device (89) which is arranged along the at least one passive section (P1, P2, P3).

9. The heating station (20) as claimed in claim 8, wherein the marking device (89) comprises a laser emitter (88) which is arranged such as to emit a laser beam (90) in the direction of the neck (16) of a pre-form (12) supported by a spinner (38) situated on the at least one passive section (P1, P2, P3).

10. The heating station (20) as claimed in claim 8, wherein the marking device (89) comprises a print head to print the reference point (87) on the neck (16) of a pre-form (12) supported by a spinner (38) situated on the at least one passive section (P1, P2, P3).

11. The heating station (20) as claimed in claim 8, wherein the heating course comprises a second downstream active section (H2), at least one passive section (P2) being interposed between the two active sections (H1, H2), the at least one marking device (89) being arranged along said passive section (P2).

12. The heating station as claimed in claim 8, wherein the heating course comprises at least one passive section (P1) which is arranged upstream from the upstream active section (H1), the at least one marking device (89) being arranged along said passive section (P1).

13. The heating station as claimed in claim 8, wherein the heating course comprises at least one passive section (P3) which is arranged downstream from the downstream active section (H2), the at least one marking device (89) being arranged along said passive section (P3).

14. The process as claimed in claim 1, wherein the marking step (E2) comprises at least one operation of production of a reference point (87), during which a determined angular area of an outer face (17) of the neck (16) is exposed to a laser beam (90) which is sufficiently powerful to mark the neck (16) of the pre-form (12) locally.

15. The process as claimed in claim 1, wherein the marking step (E2) comprises at least one operation of production of a reference point (87), during which the reference point (87) is printed on an outer face (17) of the neck (16) with a marking substance.

16. The process as claimed in claim 3, wherein the rotation of the pre-form (12) around its axis (X1) is interrupted during each marking operation.

17. The process as claimed in claim 3, wherein the marking operation is carried out while the pre-form (12) is rotating around its axis (X1).

18. The process as claimed in claim 3, wherein the marking step (E2) comprises at least two operations of production of reference points (87) in two distinct angular areas of the neck (16).

19. The process as claimed in claim 4, wherein the marking step (E2) comprises at least two operations of production of reference points (87) in two distinct angular areas of the neck (16).

20. A process for angular indexing of a pre-form (12) which comprises a body (14) and a neck (16), the process comprising:

a step (E2) of marking the neck (16) of the pre-form (12) during which at least one reference point (87) is produced on the neck (16) of the pre-form (12);

a step (E1) of a heating station (20) taking charge of the pre-form (12), during which the pre-form (12) is transported along a heating course by a spinner (38), which makes it possible to turn the pre-form (12) around its axis (X1);

wherein the marking step (E2) is carried out during the step (E1) of taking charge, when the pre-form (12) is supported by the spinner (38), and wherein the marking step (E2) comprises at least one operation of production of a reference point (87), during which a determined angular area of an outer face (17) of the neck (16) is exposed to a laser beam (90) which is sufficiently powerful to mark the neck (16) of the pre-form (12) locally.

* * * * *